(12) United States Patent
Litwiller (10) Patent No.: US 12,290,052 B2
(45) Date of Patent: *May 6, 2025

(54) BIRD FEEDER WITH MIXED SEED FEED PORT

(71) Applicant: Woodstream Corporation, Lancaster, PA (US)

(72) Inventor: Cody Litwiller, Lancaster, PA (US)

(73) Assignee: Woodstream Corporation, Lancaster, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,639

(22) Filed: Feb. 9, 2024

(65) Prior Publication Data

US 2024/0180125 A1    Jun. 6, 2024

Related U.S. Application Data

(60) Continuation of application No. 18/116,068, filed on Mar. 1, 2023, now Pat. No. 11,944,074, which is a division of application No. 17/173,581, filed on Feb. 11, 2021, now Pat. No. 11,612,146.

(51) Int. Cl.
*A01K 39/012* (2006.01)

(52) U.S. Cl.
CPC ................... *A01K 39/012* (2013.01)

(58) Field of Classification Search
CPC .. A01K 39/012; A01K 39/01; A01K 39/0125; A01K 39/014; A01K 39/04; A01K 39/0113; A01K 31/12
See application file for complete search history.

(56) References Cited

U.S. PATENT DOCUMENTS

| | | | |
|---|---|---|---|
| 4,414,922 A | 11/1983 | Hyde, Jr. | |
| 7,506,611 B1 | 3/2009 | Lush | |
| 10,609,908 B2 * | 4/2020 | Donegan | A01K 39/04 |
| 2012/0006272 A1 | 1/2012 | Colvin et al. | |
| 2014/0076239 A1 | 3/2014 | Vaughn, Jr. et al. | |
| 2014/0090600 A1 | 4/2014 | Hoysak | |
| 2015/0366167 A1 | 12/2015 | Vaughn, Jr. et al. | |
| 2016/0007573 A1 | 1/2016 | Vaughn, Jr. et al. | |
| 2016/0255819 A1 * | 9/2016 | Faunce | A01K 39/0113 |
| 2017/0311576 A1 * | 11/2017 | Hoysak | A01K 39/0113 |

* cited by examiner

*Primary Examiner* — Trinh T Nguyen
(74) *Attorney, Agent, or Firm* — Barley Snyder (57) ABSTRACT

A mesh feed port for a bird feeder comprises a plurality of intersecting members defining a periodic pattern of openings. The openings include a plurality of first openings sized to receive a seed of a first size in a predetermined orientation, a plurality of second openings sized to receive a seed of a second size distinct from the first size in a predetermined orientation, and a plurality of third openings sized to receive a seed of a third size distinct from the first size and the second size in a predetermined orientation.

20 Claims, 8 Drawing Sheets

27% WIRE (W)
27% (56)
35% (57,57')
11% (55)

FIG. 5C

28% WIRE (W)
28% (56)
34% (57,57')
10% (55)

BIRD FEEDER WITH MIXED SEED FEED PORT

CROSS-REFERENCE TO RELATED APPLICATION

This application is a continuation of U.S. patent application Ser. No. 18/116,068, filed Mar. 1, 2023, which is a divisional of U.S. patent application Ser. No. 17/173,581 filed on Feb. 11, 2021, now issued U.S. Pat. No. 11,612,146, the entire disclosures of which are incorporated herein by reference.

FIELD OF THE INVENTION

The present disclosure relates to the field of bird feeders, more particularly, to a multi-opening mesh feed port configured for use with mixed seed and to a bird feeder having at least one of such ports.

BACKGROUND

Bird feeders that house and dispense seed typically include a seed reservoir having at least one feed port or feed opening through which birds access seed in the reservoir. To reduce unwanted spillage of seed, bird feeders have recessed ports which prevent seeds from escaping due to the distance the seed must be moved before it will fall out of the feeder. However, the seeds are often difficult to reach through the port, inhibiting the feeding of smaller birds. Other types of feed ports are located proximate a floor or bottom of the feeder, requiring a bird to reach for the seed, and thus creating a level of deterrence. Feed ports of the prior art are also subject to several other drawbacks, including frequent clogging resulting in disinterest in the feeder, as well as to damage, such as by larger animals chewing on the ports to gain access to the seed.

These and other drawbacks of prior art feed ports are further complicated or worsened when mixed variety seed comprising a plurality of different seed types is used in the feeder. Specifically, prior art feed ports are not optimized for each of a plurality of discrete seed types, shapes and/or sizes. As such, they typically permit unnecessary spillage of smaller seeds, are subject to more frequent clogging, and/or create unnecessary difficulties for a feeding bird to remove the seed via the port.

Accordingly, a need exists for a bird feeder with an improved feed port specifically adapted and optimized for use with mixed variety seed.

SUMMARY

In view of the foregoing, the present disclosure is directed to a bird feeder having a seed reservoir including a seed opening. A mesh or multi-opening feed port or cover is arranged over the seed opening for retaining the seed within the reservoir, while permitting extraction of the seed through the openings by a feeding bird. In one embodiment, the feed port is arranged generally vertically such that the plurality of openings thereof extend or open laterally into a side of the feeder, placing the seed in closer proximity to a feeding bird. The feed port includes a plurality of intersecting horizontal and vertical members, such as metal wire segments, defining a periodic pattern of openings of a plurality of predetermined sizes.

According to an embodiment, the feed port is adapted for use with mixed seed, with the openings of the feed port including a plurality of first openings sized to receive a seed of a first size, a plurality of second openings sized to receive a seed of a second size, and a plurality of third openings sized to receive a seed of a third size. The openings are arranged in an alternating manner such that openings of a predetermined size are not arranged directly adjacent to other openings of the same size.

In one particularly advantageous embodiment, each of the plurality of openings is a parallelogram, such as a rectangle, with a portion of the plurality of openings comprising a vertical height greater than their horizontal width, and another portion comprising a vertical height less than their horizontal width. In one embodiment, the first openings comprise square openings of a first size, the second openings comprise square openings of a second size greater than the first size, and the third openings comprise rectangular openings of varying orientations. In a preferred embodiment, the smallest dimension of each of the first, second and third openings is greater than the larger of the average thickness or average width of a respective one of the first, second and third seed sizes. Likewise, a diagonal dimension of the first, second and third openings is less than the largest dimension of a respective one of the first, second and third seed sizes.

According to embodiments, the plurality of first, second and third openings are arranged in rows and columns, with a first row of openings comprising a row of alternating first openings and third openings. A second row of openings adjacent the first row comprises a row of alternating second openings and third openings, with the third openings having an orientation distinct from an orientation of the third openings in the first row. A first column of openings comprises a column of alternating first openings and third openings, with a second column of openings adjacent the first column comprising a column of alternating second openings and third openings. The third openings in the second column have an orientation distinct from an orientation of the third openings in the first column. In the preferred embodiment, the feed port is bordered about its periphery with only the first columns and the first rows, and thus only the first and third openings.

A bird feeder according to another embodiment of the present disclosure comprises one or more removable feed port assemblies fitted thereto. Each feed port assembly includes a port body defining a port opening. A mesh feed port according to the above embodiments is arranged within or otherwise covers the port opening. The feed port assembly may be selectively fitted over a corresponding opening formed in a housing of the feeder, permitting access to seed retained within the feeder through the port opening and the mesh feed port.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

It is to be understood that the embodiments described herein are disclosed by way of illustration only. It is not intended that the disclosure be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 1:
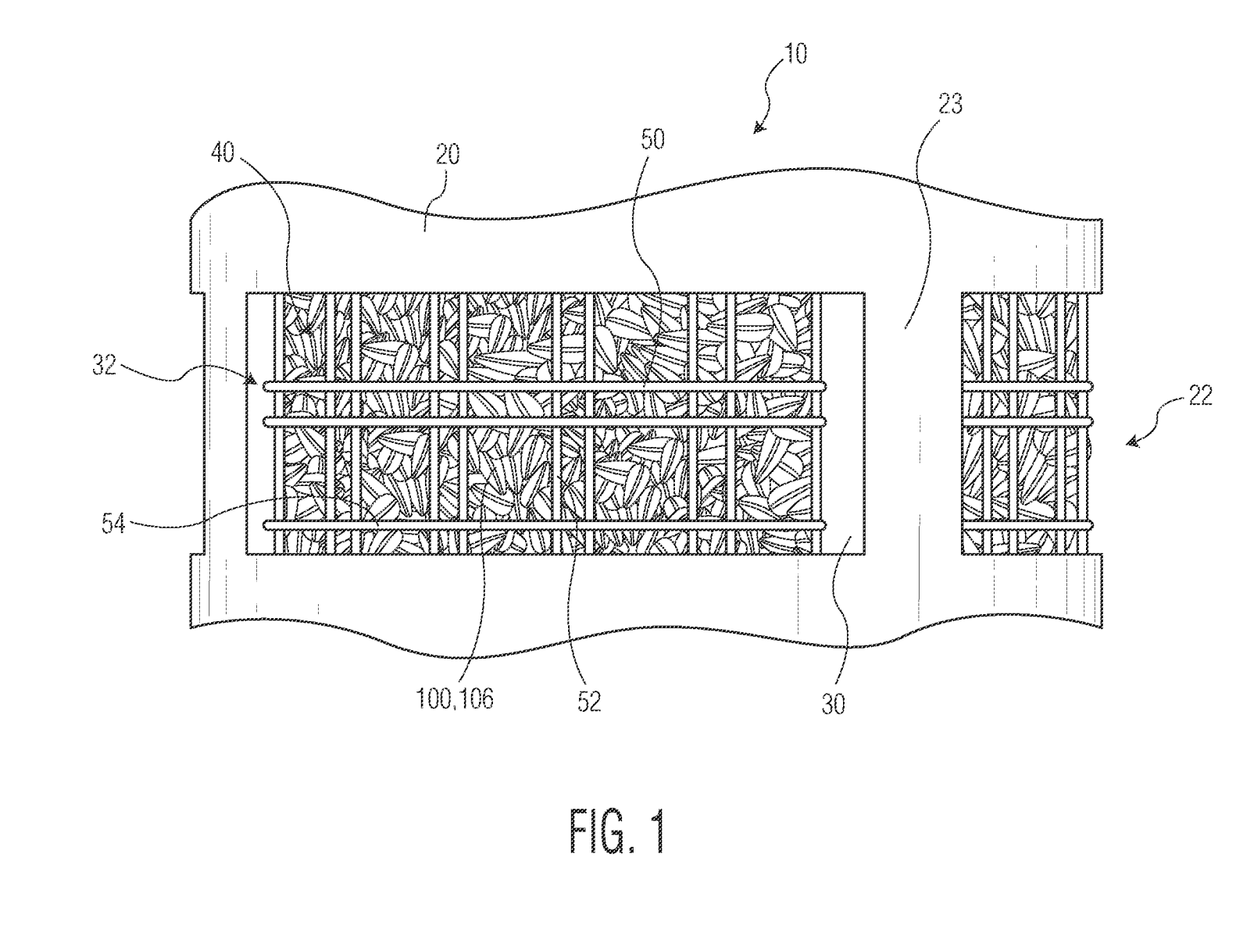
FIG. 1 is a partial perspective view of a bird feeder including a seed reservoir filled with a single seed variety and having a mesh feed port in accordance with the present disclosure.

Referring to FIG. 1, an exemplary wild bird feeder 10 useful for describing embodiments of the present disclosure includes an outer housing 20 and an inner housing 30. The inner housing 30 defines a seed reservoir or space 40 containing seed 100, in the exemplary embodiment, sunflower seeds 106 of general uniform size. The outer housing 20 and inner housing 30 may each comprise a generally cylindrical shape, with the inner housing being removably insertable into the outer housing 20 in a coaxial manner. The outer housing 20 includes one or more (e.g., four) windows or seed access openings 22 defined radially about its circumference. In the exemplary embodiment, each window 22 defines an arcuate rectangular opening, with adjacent windows separated in the circumferential direction by a vertical section 23 of the outer housing 20. Similarly, the inner housing 30 defines a corresponding plurality of arcuate windows or seed access openings 32 aligned with the windows 22 of the outer housing 20 in the radial direction. In this way, corresponding windows 22,23 define a continuous seed opening from the seed reservoir 40 of the inner housing 30 to the outside environment. In one embodiment, the inner housing 30 may be constructed of a transparent material, such as a clear polymer, and the outer housing 20 may be constructed of painted or coated metal.

Figure 2:
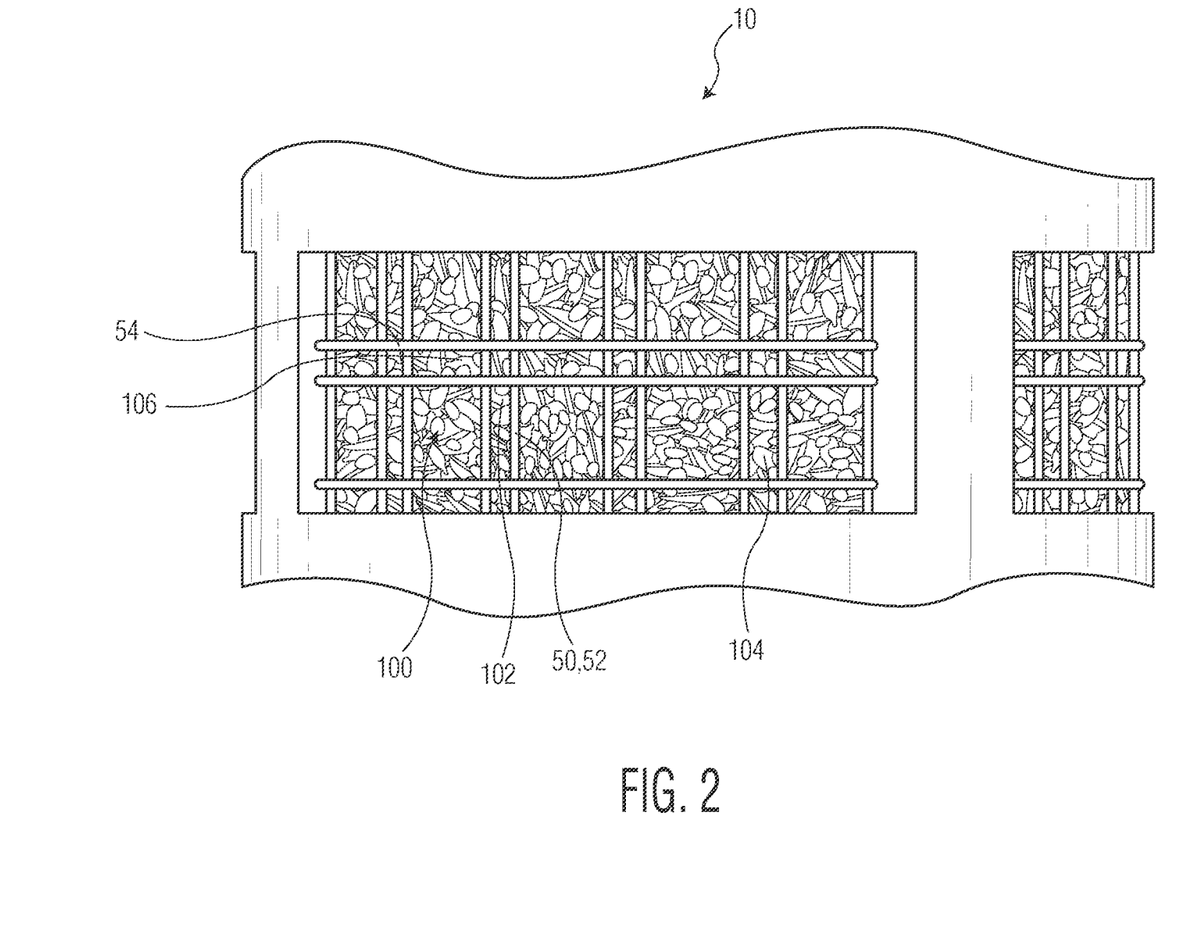
FIG. 2 is a partial perspective view of a bird feeder including a seed reservoir filled with a mixed seed variety and having a mesh feed port in accordance with the present disclosure.

Still referring to FIG. 1, the feeder 10 includes a mesh feed cover or port 50 which may be fitted over and covering each of the windows 32 of the inner housing 30 and/or the windows 22 of the outer housing 20. Each feed port 50 defines a mesh grating or grid spanning uniformly within its outer periphery. The feed ports 50 are arranged generally vertically, or parallel (coaxial) with the exterior vertical walls of the exterior and/or interior housings 20,30, such that the plurality of openings defined thereby extend or open into a side of the feeder 10 in the horizontal direction. Specifically, the feed port 50 includes a plurality of intersecting vertical segments 52 and horizontal segments 54 extending between adjoining peripheral segments, including top, bottom and lateral side segments. Each segment may be constructed of lengths of wire, such as round metal wire, with the intersecting joints thereof welded, soldered or otherwise mechanically fixed to one another. In other embodiments, the mesh grating may be constructed via metal forming operations, such as by stamping or punching one or more material (e.g., metal) sheets. As shown in FIG. 2, the intersecting vertical and horizontal segments 52,54 of the feed port 50 define a pattern of openings of varying or multiple predetermined sizes. In the illustrated embodiment, each opening is sized to correspond to a predetermined average size and/or shape of one seed type of a plurality of seeds 100 of a mixed seed variety, including millet or milo seeds 102, sunflower kernels 104 and black oil sunflower seeds 106.

Figure 3A:
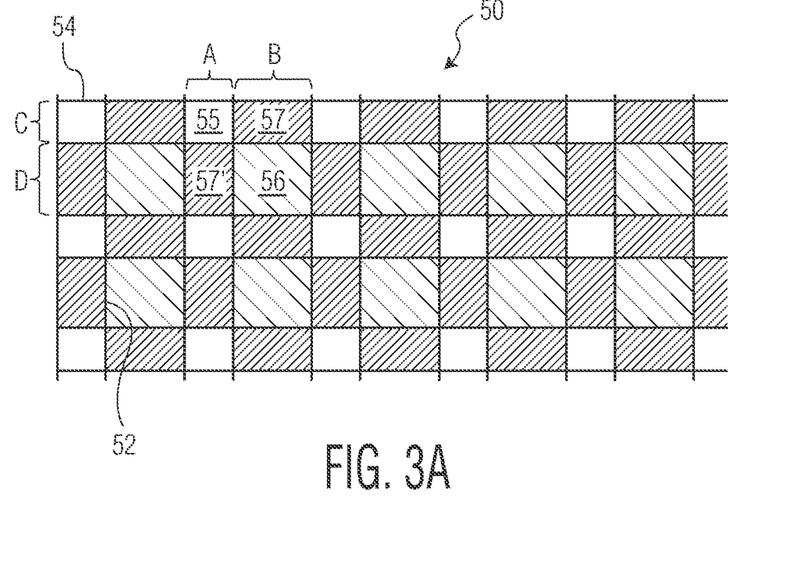
FIG. 3A is an exemplary schematic representation of the patterned mesh feed port of FIGS. 1 and 2 having a plurality of periodic openings of varying predetermined size according to an embodiment of the present disclosure.

Referring now to FIG. 3A, the mesh feed port 50 includes a plurality of first openings 55 sized to receive a seed of a first size and type, a plurality of second openings 56 sized to receive a seed of a second size and type, and a plurality of third openings 57,57' sized to receive a seed of a third size and type. The plurality of openings 55,56,57 are arranged in an alternating manner such that like-sized openings are not arranged directly adjacent (i.e., directly above, below, or laterally from) one another. According to embodiments, each of the openings comprises a quadrilateral shape, and more particularly a parallelogram, such as a square, rectangle and/or diamond shape. In the exemplary embodiment, the first openings 55 comprise square openings of a first size, the second openings 56 comprise square openings of a second size greater than the first size, and the third openings 57,57' comprise rectangular openings. As shown, a first portion of the third openings 57 are arranged in a first orientation, with their width greater than their vertical height, and a second portion of the third openings 57' are arranged in a second orientation, with their vertical height greater than their horizontal width.

The plurality of openings 55,56,57,57' are arranged in alternating columns A,B and alternating rows C,D. Specifically, a first column of openings A comprises a column of alternating first openings 55 and third openings 57'. A second column B of openings adjacent the first column A comprises a column of alternating second openings 56 and third openings 57. As illustrated, the third openings 57 in the second column B have an orientation distinct from an orientation of the third openings 57' in the first column A. Similarly, the first row of openings C comprises a row of alternating first openings 55 and third openings 57. The second row of openings D adjacent the first row C comprises alternating second openings 56 and third openings 57'. Likewise, the third openings 57' comprise an orientation distinct from the orientation of the third openings 57 in the first row C. The feed port 50 is preferably bordered about its periphery with only the first columns A and the first rows C, and thus only the first openings 55 and the third openings 57,57'.

Figure 3B:
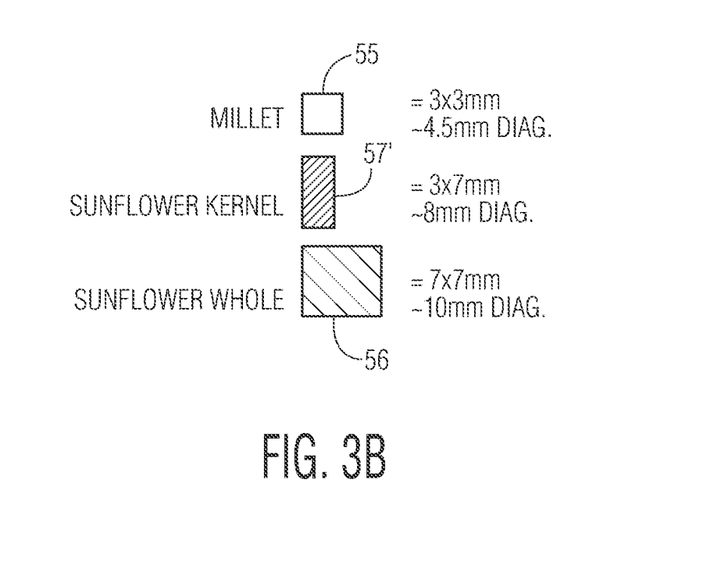
FIG. 3B is a detailed representation of each of the plurality of openings of the mesh feed port of FIG. 3A.
Figure 4A:
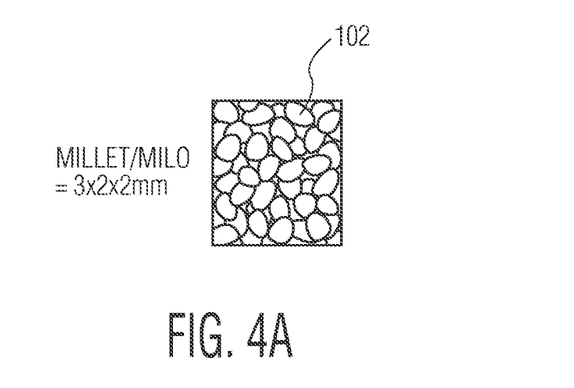
FIGS. 4A, 4B and 4C are graphical representations of each of a plurality of first, second and third seed types and their average dimensions useful for describing embodiments of the present disclosure.
Figure 4B:
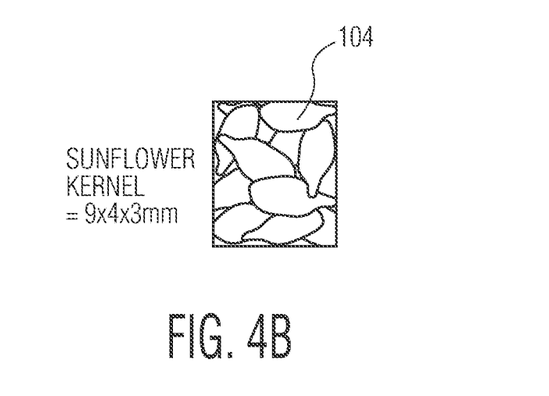
Figure 4C:
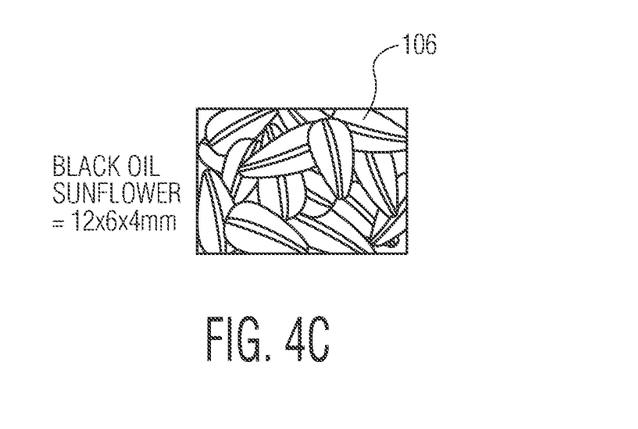
Figure 5A:
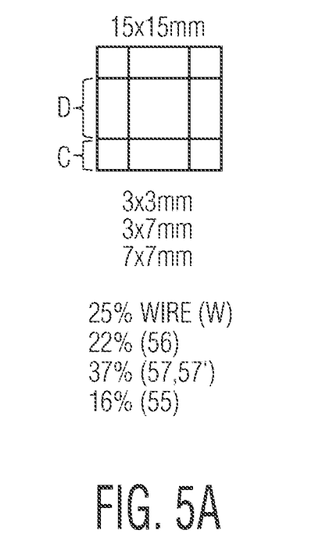
FIGS. 5A, 5B, 5C and 5D are schematic representations of a plurality of sizes and configurations of mesh feed ports according to embodiments of the present disclosure.
Figure 5B:
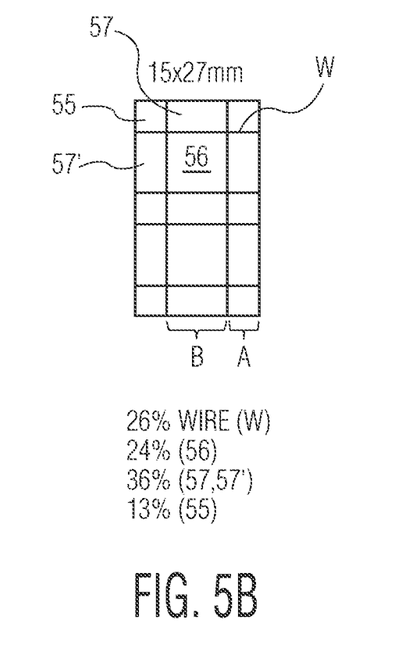
Figure 5C:
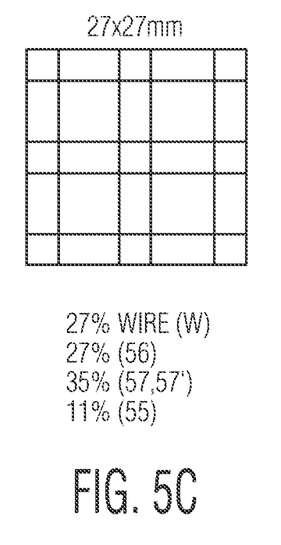
Figure 5D:
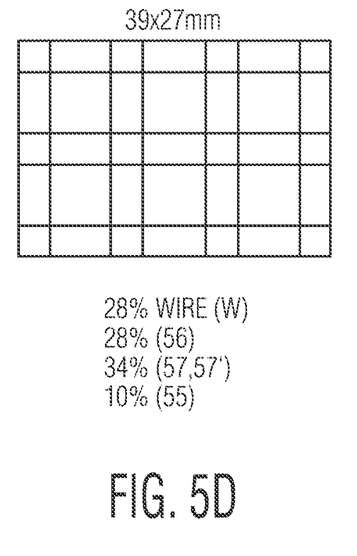

With reference to FIG. 3B, the first, second and third openings 55,56,57,57' are specifically adapted to correspond to a predetermined average seed size, including a predetermined average seed maximum dimension, a predetermined average seed minimum dimension, and a predetermined average seed intermediate dimension for each of three seed types. More specifically, in the preferred embodiment, the first openings 55 comprise a generally square shape, with a 3 millimeter (mm)×3 mm profile. The first openings 55 are sized to correspond to the millet or milo seed 102, having an average size of 3 mm×2 mm×2 mm as shown in FIG. 4A. The second openings 56 comprise a generally square shape, with a 7 mm×7 mm profile corresponding to the black oil sunflower seed 106 having a 12 mm×6 mm×4 mm average size, as illustrated in FIG. 4C. The third openings 57,57' comprise a generally rectangular shape, with a 3 mm×7 mm (or 7 mm×3 mm) profile. Referring to FIG. 4B, the third openings 57,57' correspond to the sunflower kernel 104 having a 9 mm×4 mm×3 mm average size.

It should be understood that each of the seeds 102, 104, 106 are organically shaped, and thus can varying in size by as much as 25% in any direction. As a result, each first opening 55 should be between 1.5 mm and 3.75 mm in each dimension, each second opening 56 should be between 4.5 mm and 15 mm in each dimension, and each third opening 57,57' should be between 3 mm and 11.25 mm in each dimension. The diagonal dimensions of at least the second and third openings 56,57,57' are less than the maximum dimension of the corresponding seed 104, 106, aiding in the retention of the seed within the reservoir, while not inhibiting the seeds' ability to be removed by a feeding bird in select or predetermined orientations thereof. Likewise, each of the first, second and third openings 55,56,57,57' is larger or greater than the middle dimension of the corresponding seeds 102, 104,106, such that the seed may be pulled through the opening in an at least partially axial or longitudinal orientation by a feeding bird. In this way, embodiments of the present disclose are specifically configured to limit the withdrawal of seeds to specific orientations of an average seed (e.g., with their major dimensions oriented generally or at least partially axially through the opening), while preventing the passage of seeds which are arranged with their major dimensions arranged generally parallel to the faces of the openings. Further, by ensuring the dimensions and shape of each opening closely corresponds to that of a particular seed, instances of clogging are reduced by limiting or preventing two seeds from being simultaneously introduced into a single opening.

Referring now to FIGS. 5A, 5B, 5C and 5D, embodiments of the feed port may be constructed in varying sizes. Specifically, FIG. 5A comprises three rows of openings C,D,C and three columns of openings A,B,A. Similarly, FIG. 5B comprises three columns and five rows, FIG. 5C comprises five rows and five columns, and FIG. 5D comprises five rows and seven columns. In each of the exemplary embodiments, the top and bottom of each feed port comprise rows of openings C, and each lateral side comprises a column of openings A. In this way, each feed port is bordered entirely by the comparatively smaller openings, with the largest openings 56 arranged generally in a middle of the port, or surrounded on all sides by the smaller first and second openings 55,57,57'. Having the larger openings 56 bordered on each side by smaller openings aids in locking or retaining seeds within the reservoir, reducing unwanted leakage or spillage.

Still referring to FIGS. 5A-5D, in order to achieve the stated goals of reduced feed spillage and clogging, while permitting suitable seed access and extractability, the ratio of the total cross-sectional area of the wire W to the total area of the feed port is in the range of 20-35%, and more advantageously 25-30%. Likewise, the ratio of the total area of the first openings 55 to the total area of the feed port is in the range of 5-20%, and more advantageously 10-20%. The ratio of the total area of the second openings 56 to the total area of the feed port is in the range of 15-40%, and more preferable 20-30%. The ratio of the total area of the third openings 57,57' to the total area of the feed port is in the range of 30-40%.

Figure 6:
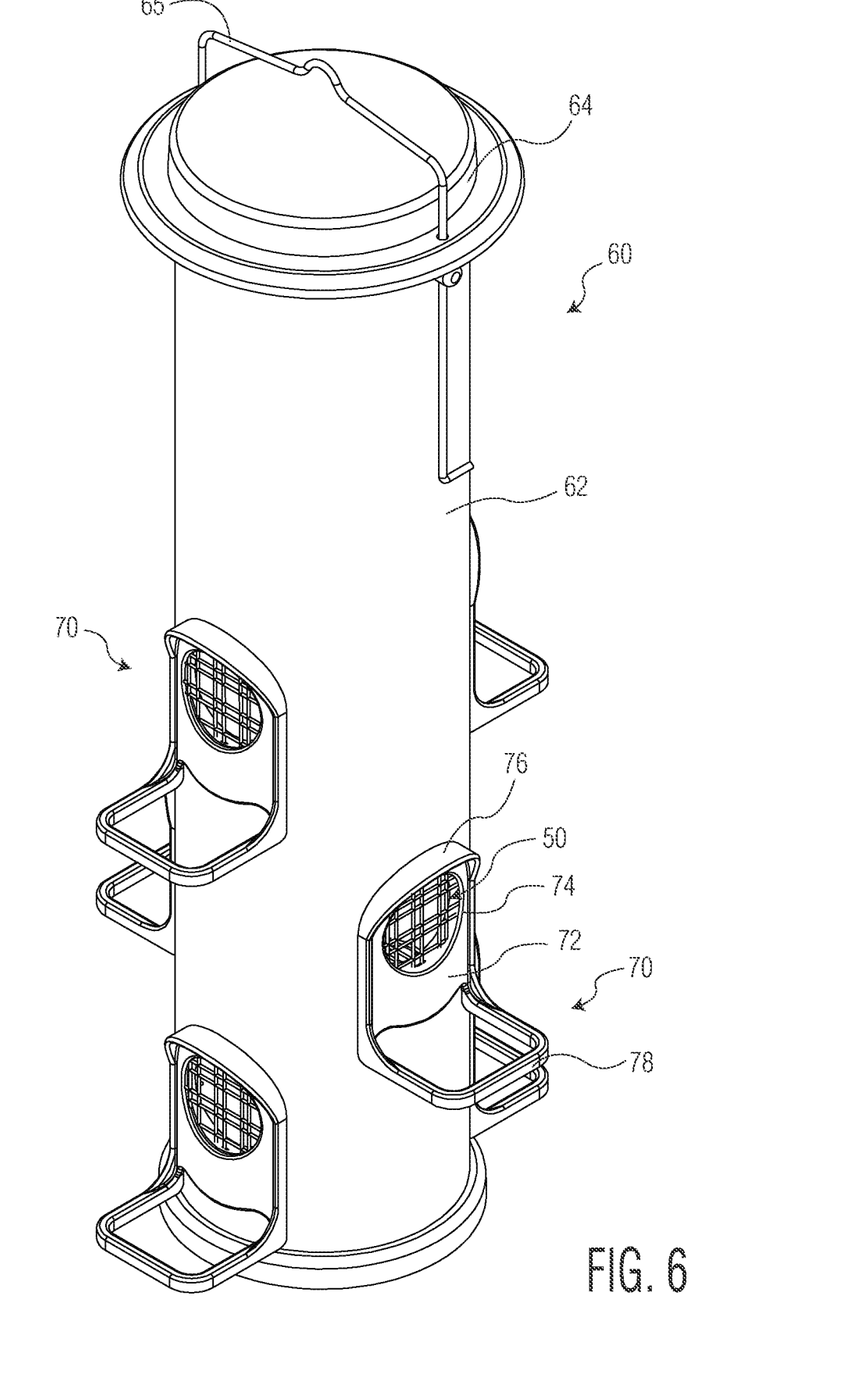
FIG. 6 is a perspective view of another bird feeder having a plurality of feed port assemblies in accordance with the present disclosure.
Figure 7:
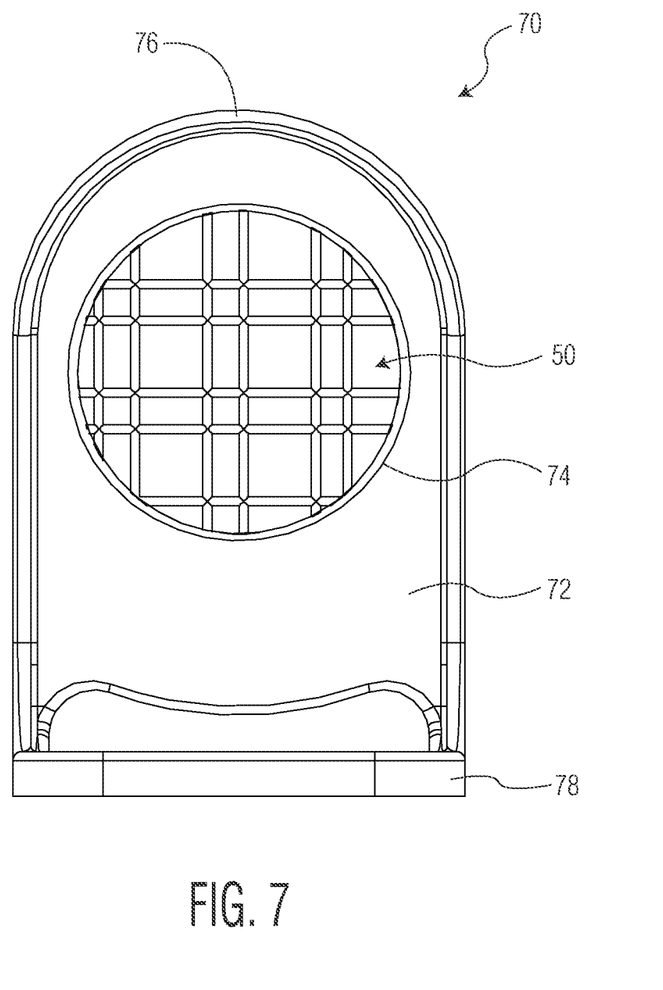
FIG. 7 is a front view of a feed port assembly as shown in FIG. 6, including a mesh feed port and a perch in accordance with the present disclosure.

Referring now to FIGS. 6 and 7, an exemplary bird feeder 60 is shown which is fitted with a plurality of feed port assemblies 70 according to embodiments of the present disclosure. The exemplary feeder 60 includes a housing 62, which may be embodied as a two-part housing as shown and described above with respect to FIGS. 1 and 2. The feeder 60 may further comprise a removable top or lid 64 for accessing an interior seed reservoir of the feeder, as well as a hanger attached to the lid and/or housing for securing the feeder in a desired location.

Each feed port assembly 70 includes one feed port 50 according to the above-described embodiments, and a port body 72. The port body 72, such as a molded polymer body, defines a port opening 74. With the feed port assembly 70 attached to the housing 62, the port opening 74 is aligned with an opening formed through the housing, permitting access to seed retained within the feeder 60 through the feed port 50. The port body 72 further defines a hood 76 extending radially outward and generally over the port opening 74, and a perch 78 configured to provide a feeding bird standing thereon access to the port opening. In the exemplary embodiment, the port opening 74 comprises a circular opening, although other shapes are possible.

In one embodiment, the feed port 50 forms part of the assembly 70, and is arranged within or adjacent the port opening 74 of the body 72. The feed port assembly 70, including the feed port 50, may be selectively fitted over an opening formed through the housing 62. The opening in the housing 62 may be larger than the port opening 74, such that the port body 72 defines a cover blocking a first portion of the opening, and only a second portion thereof is revealed through the port opening. In this way, characteristics of the feeder 60 may be adjustable. For example, a total feeding area of the feeder 60 as defined by the feed port assemblies 70 may be adjusted. Specifically, different port bodies or covers having varying port opening sizes (including no openings) may be selectively fitting over the openings in the feeder housing in order to optimize the feeder during use. Likewise, feed port assemblies may utilize different feed ports therein, with or without a change in the port opening size of the port body. For example, feed ports having different opening patterns and/or opening sizes may be utilized, allowing a single feeder to be selectively configured and reconfigured for use with, for example, different seed types. Other variations of the feed port bodies are also envisioned, such as different perches, hood sizes, and the like.

In other embodiments, the mesh feed port 50 may comprise a generally square or rectangular feed port arranged within and fixed to a correspondingly sized opening in the housing 62 of the feeder 60, similar to that shown and described above with respect to FIGS. 1 and 2. In this embodiment, only the port body 72 of feed port assembly 70 may be removable. The feed port body 72 is fitted over the feed port 50, wherein only the portion of the feed port corresponding to the port opening 74 is revealed. This arrangement also provides adjustability and/or reconfigurability, wherein a total feeding area defined by the feed port assemblies may be adjusted by selectively fitting port bodies of various port opening sizes. In some embodiments, a first portion of the feed port assemblies of a given feeder comprise a port opening and/or mesh feed port of a first type and/or size, and a second portion of the feed port assemblies comprise a port opening and/or mesh feed port of a second type and/or size, distinct from the first type or size.

As set forth above, port bodies according to the present disclosure may also be embodied as covers, without corresponding port openings formed therethrough. Accordingly, for a feeder housing have a predetermined number of openings formed therethrough, the port bodies or covers may be fitted over any or all of these openings, blocking access to the seed contained within the feeder. In this way, a predetermined number of feeding locations defined by the feeder may be selectively altered, with other potential locations blocked from use. Such selective blocking may be useful to, for example, limit feeding to a certain side of the feeder visible to a user, or for blocking the feeder completely during extended periods of desired non-use.

The ability to adjust or replace or eliminate the feed ports is significant, as it has been determined that the total area of the feed port or ports compared to a total exterior surface area of the feeder housing is an important characteristic affecting feeder performance. Accordingly, the ability to alter this ratio according to any factor, such as varying seed types, birds or other animals of interest, and/or season is particularly useful. In one embodiment, it has been determined that the total area of the feed ports should be less than 5% of the total exterior surface of the vessel or feeder housing, as the above-described mixed mesh ports may become less effective the more surface area of the vessel they cover. Further, as greater seed loss occurs with greater mesh surface area, it may be advantageous to keep the feed ports are small as possible.

The above-described embodiments of the present disclosure optimize the particular size, shape and arrangement of the feed port openings to provide unexpected functionality not present in prior art arrangements. These characteristics specifically address the particular problems found in prior art feed ports, including seed retention and seed clogging, by way of example. The characteristics of opening size, shape and relative orientation within the above-described periodic patterns define result-effective variables not recognized by the prior art.

These embodiments achieve the stated objectives with the greatest efficiency and overall performance. The embodiments described herein provide unexpected improvements in seed retention within the seed reservoir, while permitting selective extraction by a feeding bird. The above-described embodiments achieve seed loss of less than 1% under normal conditions, including during filling operations. Further, the use of various opening sizes accommodates various beak sizes, creates a large eating surface, and thus labor free sorting of seeds and feeding. The sifting nature of the multi-opening, multi-size mesh reduces or eliminates instances of blockage. Further, due to the vertical positioning of the mesh port proximate a head or mouth of a standing bird and the varied opening sizes and accompanying varied eating surfaces, bird interaction with feeders fitted with these feed ports has been improved, leading to longer feeding time and more feeder activity.

The foregoing descriptions and drawings should be considered as illustrative only of the principles of the disclosure. The embodiments may be configured in a variety of shapes and sizes and is not limited by the dimensions of the preferred embodiment. Numerous applications of the present disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

What is claimed is:

1. A bird feeder comprising:
   a housing;
   a seed reservoir defined within the housing and including at least one seed access opening; and
   a mesh feed port fitted over the at least one seed opening, the feed port defining a periodic pattern of openings of a plurality of predetermined sizes in communication with the seed reservoir, the feed port arranged such that the plurality of openings extend into a side of the feeder, the plurality of openings including:
   a plurality of first openings sized to receive a first seed type of a first size;
   a plurality of second openings sized to receive a second seed type of a second size greater than the first size; and
   a plurality of third openings sized to receive a third seed type of a third size, the openings are arranged in rows and columns, the plurality of openings are arranged in an alternating manner such that openings of a predetermined size are not arranged directly adjacent to other openings of the same predetermined size.

2. The bird feeder of claim 1, wherein a first portion of the plurality of third openings each comprise a height greater than their width and a second portion of the plurality of third openings each comprise a height less than their width.

3. The bird feeder of claim 1, wherein each of the plurality of first and second openings is square, and each of the plurality of third openings is rectangular.

4. The bird feeder of claim 1, wherein a first row of openings comprises a row of alternating first openings and third openings.

5. The bird feeder of claim 4, wherein a second row of openings adjacent the first row of openings comprises a row of alternating second openings and third openings, wherein the third openings of the second row of openings have an orientation distinct from an orientation of the third openings in the first row of openings.

6. The bird feeder of claim 5, wherein:
   a first column of openings comprises a column of alternating first openings and third openings;
   a second column of openings adjacent the first column of openings comprises a column of alternating third openings and second openings, the third openings in the second column of openings having an orientation distinct from an orientation of the third openings in the first column of openings; and
   the feed port is bordered about its periphery with only first columns of openings and first rows of openings.

7. A bird feeder, comprising:
   a housing;
   a seed reservoir defined within the housing and including at least one seed access opening; and
   a mesh feed port fitted over the at least one seed opening, the feed port defining a periodic pattern of openings of a plurality of predetermined sizes in communication with the seed reservoir, the feed port arranged such that the plurality of openings extend into a side of the feeder, the plurality of openings including:
   a plurality of first openings sized to receive a first seed type of a first size; and
   a plurality of second openings sized to receive a second seed type of a second size, wherein the smallest dimension of each of the first and second openings is greater than the larger of the average thickness or average width of a respective one of the first and second seed sizes.

8. The bird feeder of claim 7, wherein the plurality of openings further includes a plurality of third openings sized to receive a third seed type of a third size.

9. The bird feeder of claim 8, wherein the smallest dimension of each of the first, second and third openings is greater than the larger of the average thickness or average width of a respective one of the first, second and third seed sizes.

10. The bird feeder of claim 9, wherein a diagonal dimension of each of the first, second and third openings is less than the largest dimension of a respective one of the first, second and third seed sizes.

11. The bird feeder of claim 10, wherein the first seed type comprises a millet or milo seed, the second seed type comprises a sunflower kernel, and the third seed type comprises a black oil sunflower seed.

12. A bird feeder comprising:
a housing;
a seed reservoir defined within the housing and including at least one seed access opening; and
a feed port fitted over the at least one seed opening, the feed port comprising a single mesh element defining a periodic pattern of openings of a plurality of predetermined sizes in communication with the seed reservoir, the openings including:
a plurality of first openings sized to receive a first seed type of a first size;
a plurality of second openings sized to receive a second seed type of a second size; and
a plurality of third openings sized to receive a third seed type of a third size, wherein a smallest dimension of each of the first, second and third openings is greater than the larger of an average thickness or an average width of a respective one of the first, second and third seed sizes.

13. The bird feeder of claim 12, wherein a diagonal dimension of each of the second and third openings is less than the largest dimension of a respective one of the second and third seed sizes.

14. The bird feeder of claim 13, wherein the mesh element includes a plurality of first segments extending in a first direction and a plurality of second segments extending in a second direction, distinct from the first direction, the first and second segments intersecting to define the periodic pattern of first, second and third openings of the plurality of predetermined sizes.

15. The bird feeder of claim 14, wherein the first segments include vertically extending segments and the second segments include horizontally extending segments, the openings arranged in rows and columns defined by the first and second segments.

16. The bird feeder of claim 15, wherein a first row of openings comprises a row of alternating first openings and third openings.

17. The bird feeder of claim 15, wherein the first and second segments comprise lengths of wire, and the first and second segments are mechanically joined at intersecting points thereof.

18. The bird feeder of claim 12, wherein the first seed type comprises a millet or milo seed, the second seed type comprises a sunflower kernel, and the third seed type comprises a black oil sunflower seed.

19. The bird feeder of claim 12, wherein:
the plurality of first openings comprise parallelogram openings of a first size;
the plurality of second openings comprise parallelogram openings of a second size; greater than the first size; and
the plurality of third openings comprise a shape distinct from that of the first openings and the second openings.

20. A bird feeder comprising:
a housing;
a seed reservoir defined within the housing and including at least one seed access opening; and
a mesh feed port fitted over the at least one seed opening, the feed port defining a periodic pattern of openings of a plurality of predetermined sizes in communication with the seed reservoir, the feed port arranged such that the plurality of openings extend into a side of the feeder, the plurality of openings including:
a plurality of first openings sized to receive a first seed type of a first size;
a plurality of second openings sized to receive a second seed type of a second size greater than the first size; and
a plurality of third openings sized to receive a third seed type of a third size, the openings are arranged in rows and columns, a first portion of the plurality of third openings each comprise a height greater than their width and a second portion of the plurality of third openings each comprise a height less than their width.

\* \* \* \* \*